US011463012B1

(12) United States Patent
Liu et al.

(10) Patent No.: US 11,463,012 B1
(45) Date of Patent: Oct. 4, 2022

(54) ARCHITECTURE FOR MULTI-PORT AC/DC SWITCHING MODE POWER SUPPLY

(71) Applicant: GaN Systems Inc., Ottawa (CA)

(72) Inventors: Xuechao Liu, Kanata (CA); Paul Wiener, Pleasanton, CA (US)

(73) Assignee: GaN Systems Inc., Kanata (CA)

( * ) Notice: Subject to any disclaimer, the term of this patent is extended or adjusted under 35 U.S.C. 154(b) by 0 days.

(21) Appl. No.: 17/688,170

(22) Filed: Mar. 7, 2022

Related U.S. Application Data

(60) Provisional application No. 63/161,558, filed on Mar. 16, 2021.

(51) Int. Cl.
| | | |
|---|---|---|
| *H02M 3/335* | (2006.01) | |
| *H02M 3/158* | (2006.01) | |
| *H02M 1/00* | (2006.01) | |
| *H02M 1/42* | (2007.01) | |

(52) U.S. Cl.
CPC ..... *H02M 3/33576* (2013.01); *H02M 1/0009* (2021.05); *H02M 1/4208* (2013.01); *H02M 3/158* (2013.01)

(58) Field of Classification Search
CPC ........... H02M 3/33576; H02M 1/0009; H02M 1/4208; H02M 3/158
See application file for complete search history.

(56) References Cited

U.S. PATENT DOCUMENTS

| | | | | |
|---|---|---|---|---|
| 8,344,707 B2* | 1/2013 | Melanson | ............. | H02M 3/156 323/222 |
| 9,510,401 B1* | 11/2016 | Kost | ................... | H02M 1/4225 |
| 2009/0160254 A1* | 6/2009 | Wu | ...................... | H02M 1/4208 307/64 |
| 2013/0035802 A1* | 2/2013 | Khaitan | .................. | H02J 3/381 700/297 |
| 2016/0141951 A1* | 5/2016 | Mao | ........................ | H02M 1/36 363/21.02 |

(Continued)

OTHER PUBLICATIONS

Simple Circuitry Gets That Old PFC Controller Working in a Boost-Follower PFC Application by Michael O Loughlin Applications Engineering, Texas Instruments Limited, Manchester, NH, Oct. 8, 2003.*

*Primary Examiner* — Rafael O De Leon Domenech

(74) *Attorney, Agent, or Firm* — Miltons IP/p.i.

(57) ABSTRACT

An architecture for a multi-port AC/DC Switching Mode Power Supply (SMPS) with Power Factor Correction (PFC) comprises power management control (PMC) for PFC On/Off Control and Smart Power Distribution, and optionally, a boost follower circuit. For example, in a universal AC/DC multi-port USB-C Power Delivery (PD) adapter, PMC enables turn-on and turn-off of PFC dependent on output port operational status and a combined load of active output ports. A microprocessor control unit (MCU) receives operational status, a voltage sense input and a current sense input for each USB port, computes output power for each USB port, and executes a power distribution protocol to turn-on or turn-off PFC dependent on the combined load from each USB port. Available power may be distributed intelligently to one or more ports, dependent on load. In an example embodiment, turning-off PFC for low load and low AC line input increases efficiency by 3% to 5%.

30 Claims, 10 Drawing Sheets

Multi-port USB SMPS
with PFC On/Off Control and Smart Power
Distribution

(56) References Cited

U.S. PATENT DOCUMENTS

| | | | | |
|---|---|---|---|---|
| 2016/0141964 A1* | 5/2016 | Yu | .................... | H02M 3/33507 |
| | | | | 363/21.02 |
| 2016/0149489 A1* | 5/2016 | Tang | ..................... | G01R 21/06 |
| | | | | 702/61 |
| 2018/0041119 A1* | 2/2018 | Zhang | ................. | H02M 1/4258 |
| 2020/0358349 A1* | 11/2020 | Livescu | .............. | H02M 1/4208 |

* cited by examiner

Simplified single-port low power AC/DC Switch Mode Power Supply without PFC (<75W max output)

Conventional Multi-Port Switch Mode Power Supply with Power Factor Correction (>75W max output)

Multi-port USB SMPS
with PFC On/Off Control and Smart Power Distribution

- VCC_PFC: PFC supply voltage;
- VCC_QR: QR Flyback supply voltage
- PFC ON/OFF: PFC on and off signal (ON: 5V, Off: 0V)
- FB: Voltage feedback to PFC controller
- CS1: Current and voltage sense for USB-C1
- CS2: Current and voltage sense for USB-C2
- Vdc: DC voltage at PFC output; it is variable with input AC voltage
- Vbus: DC voltage at QR Flyback output; fixed at 22V

Operation of the Boost Follower Circuit of the example embodiment

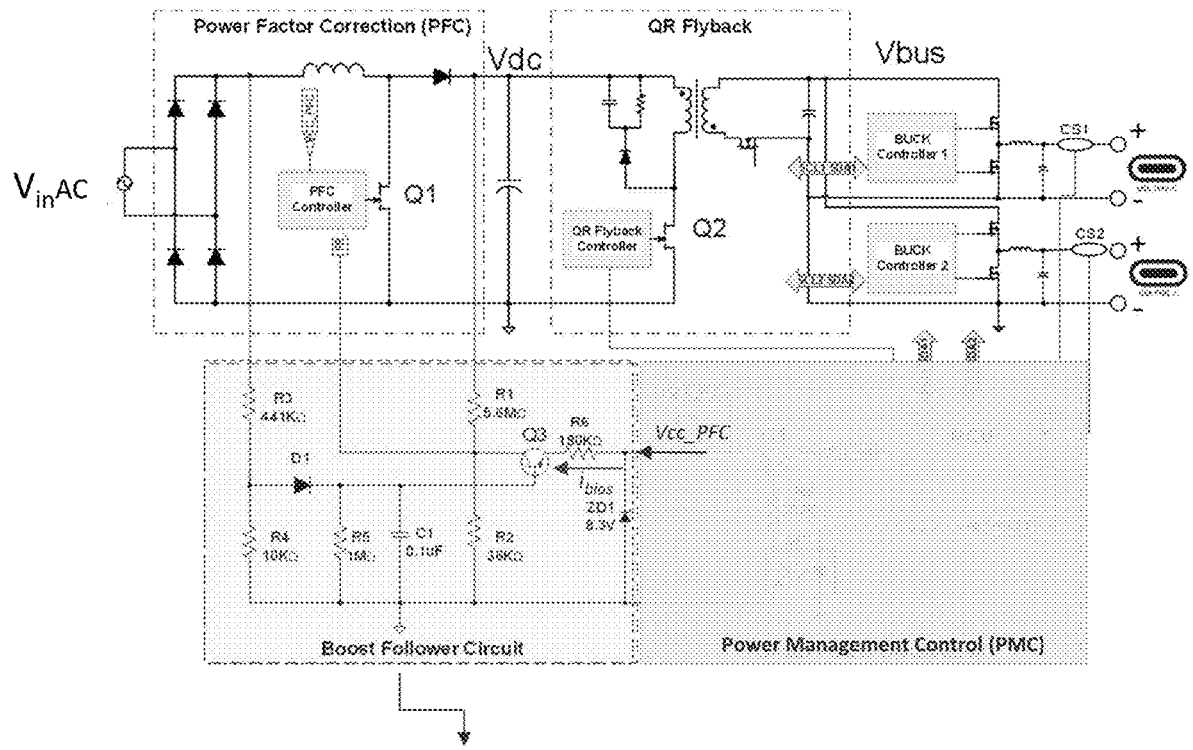

- R1 and R2 are used to sense the PFC output voltage of PFC Vdc
- R3, R4, C1 and D1 are used to sense the AC input peak voltage
- The bias current $i_{bias}$ is inversely proportional to the AC peak voltage through transistor Q3, R6 and ZD1 8.3V bias voltage.
- The FB signal is formulated together with Vdc and AC input voltage. The PFC output voltage Vdc is equal to:

$$Vdc = \left(\frac{Vref}{R2} - i_{bias}\right) \times R1 + Vref$$

where: Vref=2.5V, R2=36KΩ, R1=5.6MΩ

Fig. 6

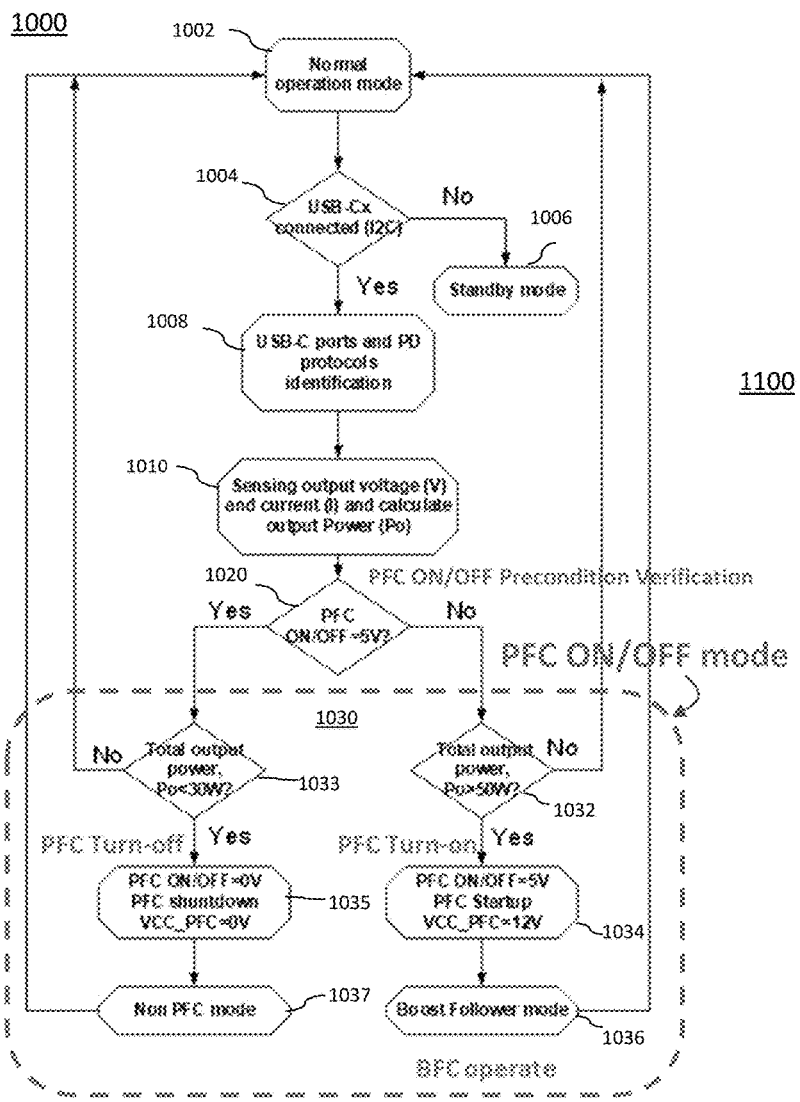
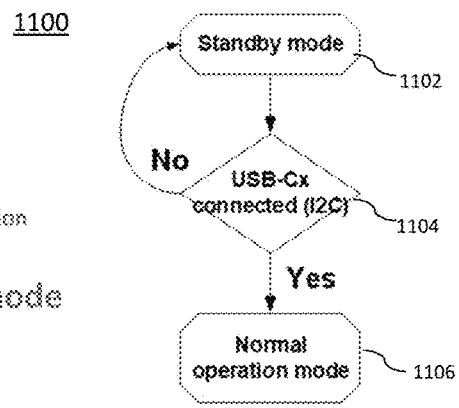
Fig. 10
Fig. 11

ARCHITECTURE FOR MULTI-PORT AC/DC SWITCHING MODE POWER SUPPLY

CROSS-REFERENCE TO RELATED APPLICATION(S)

This application claims priority from United States provisional patent application no. 63/161,558, filed Mar. 16, 2021, entitled "ARCHITECTURE FOR MULTI-PORT AC/DC SWITCHING MODE POWER SUPPLY", which is incorporated herein by reference in its entirety.

TECHNICAL FIELD

This invention relates to switching mode power supplies (SMPS), and more particularly to AC/DC adapters with USB ports for powering electronic devices.

BACKGROUND

There is demand for SMPS comprising AC/DC converters, such as Universal AC input AC/DC adapters that are compact, lightweight, and efficient, and which are powerful enough for rapid charging of one or several smartphones, tablets, laptops and other personal electronic devices.

Universal AC input AC/DC power adapters are designed to operate over a wide range of AC input voltages, typically between 90 Volts AC and 264 Volts AC, so that they are applicable worldwide. Low power AC/DC adapters with USB ports are now widely used for charging many types of small portable electronic devices. Adapters with USB Type-A (USB-A) ports are typically limited to ≤30 W. Adapters with USB Type-C (USB-C) ports can be used for >30 W. The output power depends on the load. For example, a smartphone may require 30 W, while a larger device such as a laptop may require a USB-C port providing at least 65 W for rapid charging.

Various industry standards are applicable to USB Power Delivery (PD) adapters, e.g. IEC61000-302; IEC 62368-1 and EN55032, et al. For example, for power adapters having a maximum rated power above 75 W, power factor correction (PFC) is required by various power delivery standards. Standards also place limits on total harmonic distortion (THD), electromagnetic compatibility (EMC), safety requirements, et al.

Although low power adapters, e.g. 30 W phone chargers and 65 W laptop chargers do not need PFC, if it is desired to provide an output of >75 W, e.g. a 100 W multi-port charger capable of charging both a phone and a laptop, the applicable standards must be met, including the requirement for PFC. PFC improves power factor and reduces total harmonic distortion (THD) for higher power outputs. However, there are transistor, diode, and PFC inductor losses on the PFC stage and these significantly reduce efficiency when the PFC is used for lower power applications, e.g. ≤30 W.

Thus, there is a need for improvements to multi-port AC/DC SMPS, such as universal multi-port USB AC/DC PD adapters, e.g. to provide improved efficiency for operation over a range of AC line input voltages and power outputs.

SUMMARY OF INVENTION

The present invention seeks to provide an architecture for a multi-port AC/DC SMPS, e.g. a USB-C multi-port PD adapter, which provides at least one of higher efficiency, energy saving, and power distribution amongst multiple ports.

Disclosed herein is an architecture for a multi-port AC/DC Switching Mode Power Supply (SMPS) with Power Factor Correction (PFC) comprising power management control (PMC) for PFC On/Off Control and Smart Power Distribution, and optionally, a boost follower circuit. For example, in a universal AC/DC multi-port USB-C PD adapter, PMC enables turn-on and turn-off of PFC dependent on output port operational status and a combined load of active output ports. A microprocessor control unit (MCU) receives operational status, a voltage sense input and a current sense input for each USB port, computes output power for each USB port, and executes a power distribution protocol to turn-on or turn-off PFC dependent on the combined load from each USB port. Available power may be distributed intelligently to one or more ports, dependent on load.

One aspect provides a multi-port AC/DC Switching Mode Power Supply (SMPS) comprising a power factor correction circuit (PFC) for converting an AC input voltage to a DC voltage Vdc, and a DC/DC converter which receives Vdc and supplies a bus voltage Vbus to a plurality of output ports, each output port comprising a DC/DC converter providing an output voltage Vout, comprising:
power control comprising a microcontroller unit (MCU) and a PFC On/Off control circuit comprising means to turn the PFC on and off;
each of the output ports comprising a current sense circuit and a voltage sense circuit which output current sense and voltage sense signals;
the MCU having inputs for receiving said current sense and voltage sense signals from the current sense circuit and voltage sense circuit of each output port, and having an interface to controllers of the DC/DC converters of each of the output ports;
the MCU being configured to execute a power management protocol comprising:
obtaining an output status comprising an operational status of each outport port, and an output power of each output port, computed from the current and voltage sense signals from each output port, and
based on the output status, outputting a trigger signal to the PFC on/off control circuit to turn the PFC on or off.

A second aspect provides a power management circuit for a multi-port AC/DC Switching Mode Power Supply (SMPS), wherein the SMPS comprises a power factor correction circuit (PFC) for converting an AC input voltage to a DC voltage Vdc and a DC/DC converter which receives Vdc and supplies a bus voltage Vbus to a plurality of output ports, each comprising a DC/DC converter providing an output voltage Vout, the power management/distribution circuit comprising:
a microcontroller unit (MCU) and a PFC On/Off control circuit comprising means to turn the PFC on and off;
each of the output ports comprising a current sense circuit and a voltage sense circuit which output current sense and voltage sense signals;
the MCU having inputs for receiving said current sense and voltage sense signals from the current sense circuit and voltage sense circuit of each output port, and having an interface to controllers of the DC/DC converters of each of the output ports;
the MCU being configured to execute a power management protocol comprising:

obtaining an output status comprising an operational status of each outport port, and an output power of each output port, computed from the current and voltage sense signals from each output port, and based on the output status, outputting a trigger signal to the PFC on/off control circuit to turn the PFC on or off.

A third aspect provides method of operating a multi-port AC/DC SMPS which comprises power factor correction (PFC) and supplies a plurality of output ports, comprising: in a microprocessor unit (MCU) of a power management control circuit, monitoring an operational status of each output port and a current and voltage being supplied to each output port;

computing an output power of each output port from said current and voltage being supplied to each output port; and based on the operational status of each output port, and a combined output power being supplied to each output port, executing a power management protocol comprising:

when the combined output power is greater than a first threshold value, outputting a trigger signal to a PFC On/Off circuit to turn on PFC or maintain the PFC in an on-state;

when the combined output power is less than a second threshold value, outputting a trigger signal to the PFC On/Off circuit to turn off PFC or maintain the PFC in an off-state.

For example, when only one output port is operational, enabling the maximum output power to be supplied to said one output port; and when two or more output ports are operational, enabling power distribution of the maximum output power amongst the two or more ports that are operational.

The power distribution may comprise unequal distribution of power to the two or more ports.

A fourth aspect provides a power management circuit for a multi-port AC/DC SMPS which comprises power factor correction (PFC) and supplies a plurality of output ports, comprising:

a microprocessor control unit (MCU) having an interface for monitoring an operational status of each output port and inputs for receiving voltage sense and current sense signals from each port, a PFC On/Off circuit comprising means for turning the PFC on and off; and the (MCU) being configured to implement a method as described herein.

A first embodiment provides a multi-port AC/DC Switching Mode Power Supply (SMPS) comprising a power factor correction circuit (PFC) for converting an AC input voltage to a DC voltage Vdc, and a DC/DC converter which receives Vdc and supplies a bus voltage Vbus to a plurality of output ports, each output port comprising a DC/DC buck converter providing an output voltage Vout, comprising:

power control comprising a microcontroller unit (MCU) and a PFC On/Off control circuit for providing a supply voltage Vcc_PFC to a controller of the PFC (PFC controller) to turn the PFC on and off;

each of the output ports comprising a current sense circuit and a voltage sense circuit which output current sense and voltage sense signals;

the MCU having inputs for receiving said current sense and voltage sense signals from the current sense circuit and voltage sense circuit of each output port, and having an interface to controllers of the DC/DC buck converters of each of the output ports;

the MCU being configured to execute a power management protocol comprising:

obtaining an output status comprising an operational status of each outport port, and an output power of each output port, computed from the current and voltage sense signals from each output port, and based on the output status, outputting a PFC On/Off trigger signal to the PFC On/Off control circuit to control the supply voltage Vcc_PFC to the PFC controller to turn the PFC on or off.

For example, outputting a PFC On/Off trigger signal to the PFC on/off control circuit comprises:

when the combined output power is greater than a first threshold value, outputting a PFC On/Off signal which turns on the PFC or maintains the PFC in an on-state; and when the combined output power is less than a second threshold value, outputting a PFC On/Off signal which turns off the PFC or maintains the PFC in an off-state.

The first threshold value and second threshold value are different by a hysteresis value (switching differential) to avoid frequent or unnecessary switching on and off of the PFC, e.g. when there are small power fluctuations.

The power management protocol may comprise smart power distribution to one or more ports, e.g. it may comprise:

when only one output port is operational, enabling a maximum output power to be supplied to said one output port; and when two or more output ports are operational, enabling power distribution of the maximum output power amongst the two or more output ports that are operational.

The protocol includes identification of active ports, and depending on whether one or more ports are active, negotiating what is the maximum available power for each port. Power distribution to multiple ports may be equal or unequal. For example if only one port is operational (active), the maximum available power may be directed to the one operational port, e.g. 100 W for fast charging of one device; if two or more ports are operational, power may be directed unequally, to the two or more operational ports, e.g. 65 W to one port for charging a laptop and 30 W to another port for charging a smartphone.

The DC/DC converter may have a single end Flyback topology comprising a Quasi-Resonant Flyback topology, an Active Clamp Flyback Topology or another type of single end Flyback topology.

Optionally the SMPS comprises a Boost Follower Circuit (BFC). The BFC may be controlled by the supply voltage Vcc_PFC so that the BFC is turned on when the PFC is turned on and the BFC is turned off when the PFC is turned off.

In example embodiments of a multi-port AC/DC SMPS the power management protocol comprises:

a start-up mode;

a normal operational mode; and a standby mode.

For example, available power may be distributed intelligently to one or more ports, dependent on load and PFC is turned-on or turned-off dependent on load. In an example embodiment, turning-off PFC for low load and low AC line input increases efficiency by 3% to 5%.

A second embodiment provides a power management circuit for a multi-port AC/DC Switching Mode Power Supply (SMPS), wherein the SMPS comprises a power factor correction circuit (PFC) for converting an AC input voltage to a DC voltage Vdc and a DC/DC converter which receives Vdc and supplies a bus voltage Vbus to a plurality of output ports, each comprising a DC/DC buck converter providing an output voltage Vout, the power management/distribution circuit comprising:
a microcontroller unit (MCU) and a PFC On/Off control circuit for providing a supply voltage Vcc_PFC to a controller of the PFC (PFC controller) to turn the PFC on and off;
each of the output ports comprising a current sense circuit and a voltage sense circuit which output current sense and voltage sense signals;
the MCU having inputs for receiving said current sense and voltage sense signals from the current sense circuit and voltage sense circuit of each output port, and having an interface to controllers of the DC/DC buck converters of each of the output ports;
the MCU being configured to execute a power management protocol comprising:
obtaining an output status comprising an operational status of each outport port, and an output power of each output port, computed from the current and voltage sense signals from each output port, and
based on the output status, outputting a PFC On/Off trigger signal to the PFC on/off control circuit to control the supply voltage Vcc_PFC to the PFC controller to turn the PFC on or off.

A third embodiment provides a method of operating a multi-port AC/DC SMPS which comprises power factor correction (PFC) and supplies a maximum output power of >75 W to a plurality of output ports, comprising:
in a microprocessor unit (MCU) of a power management control circuit, monitoring an operational status of each output port and a current and voltage being supplied to each output port;
computing an output power of each output port from said current and voltage being supplied to each output port; and
based on the operational status of each output port, and a combined output power being supplied to each output port, executing a power management protocol comprising:
when the combined output power is greater than a first threshold value, outputting a PFC On/Off trigger signal to a PFC On/Off circuit to turn on PFC or maintain the PFC in an on-state;
when the combined output power is less than a second threshold value, outputting a PFC On/Off trigger signal to the PFC On/Off circuit to turn off PFC or maintain the PFC in an off-state;
For example, the method may comprise:
when only one output port is operational, enabling the maximum output power to be supplied to said one output port; and
when two or more output ports are operational, enabling power distribution of the maximum output power amongst the two or more ports that are operational.
Power distribution may comprise equal or unequal distribution of power to the two or more ports.
Where the multi-port AC/DC SMPS comprises a boost follower circuit (BFC), the method may comprise turning on the BFC when PFC is on and turning off the BFC when PFC is off.

A fourth embodiment provides a power management circuit for a multi-port AC/DC SMPS which comprises power factor correction (PFC) and supplies a maximum output power of >75 W to a plurality of output ports, comprising:
a microprocessor control unit (MCU) having an interface for monitoring an operational status of each output port and inputs for receiving voltage sense and current sense signals from each port,
a PFC On/Off circuit for controlling a supply voltage to the PFC to turn-on and turn-off the PFC;
wherein the (MCU) being configured to implement a method as disclosed herein.

A fifth embodiment provides a multi-port USB Power Delivery (PD) adapter comprising a multiport AC/DC SMPS comprising power management comprising PFC On/Off control and smart power distribution as disclosed herein.

A sixth embodiment provides a boost follower circuit for a multi-port AC/DC SMPS, comprising:
a first voltage divider comprising resistors R1 and R2 to sense the PFC output voltage Vdc;
a second voltage divider comprising resistors R3 and R4, a diode D1 and a capacitor C1 to sense the AC input peak voltage from Vrect;
a transistor Q3, resistor R6, and Zener diode ZD1 configured to provide a bias current $i_{bias}$, wherein bias current $i_{bias}$ is inversely proportional to the AC peak voltage through the transistor Q3, resistor R6, and Zener diode ZD1, which provides a bias voltage; and
wherein a feedback signal FB is provided to the PFC controller and the PFC output voltage $V_{dc}$ is following with input AC voltage and equals to:

$$Vdc = \left(\frac{Vref}{R2} - i_{bias}\right) \times R1 + Vref.$$

The boost follower circuit may be controlled by the same supply voltage Vcc_PFC, as for the PFC, so that when the PFC is on, the BFC is on, and when the PFC is off, the BFC is off.

With respect to alternative terminology, switching mode power supplies (SMPS) may be referred to alternatively as switch mode power supplies or switched mode power supplies.

Thus, multiport AC/DC SMPS of example embodiments, such as PD adapters, comprise power management control comprising PFC On/Off Control and Smart Power Distribution which to provide at least one of enhanced efficiency, improved reliability, and power distribution amongst multiple ports.

BRIEF DESCRIPTION OF THE DRAWINGS

FIG. 6 shows a circuit schematic to explain operation of the boost follower circuit (BFC) of the first example embodiment shown in FIG. 4;

FIG. 10 shows a flow chart for power management control of an embodiment comprising PFC On/Off control and smart power distribution for normal operational mode;

FIG. 11 shows a flow chart for power management control of an embodiment comprising PFC On/Off control and smart power distribution for standby mode;

The foregoing and other features, aspects and advantages of the present invention will become more apparent from the following detailed description, taken in conjunction with the accompanying drawings, of some example embodiments, which description is by way of example only.

DETAILED DESCRIPTION

Figure 1:
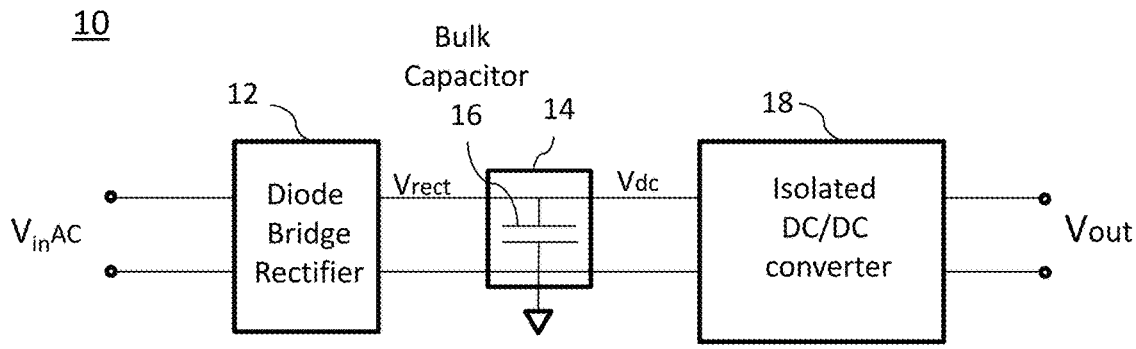
FIG. 1 (Prior Art) shows a simplified functional block diagram for a single-port AC/DC Switching Mode Power Supply, without PFC.

A simplified functional block diagram for a typical single-port low power AC/DC SMPS 10 without PFC, for a maximum output power of <75 W, is shown in FIG. 1. The SMPS 10 comprises a diode bridge rectifier 12 which rectifies input AC voltage $V_{AC}$, to provide rectified voltage $V_{rect}$ to charge the bulk capacitor 16 of the energy storage circuit 14 to provide $V_{dc}$ to the isolated DC/DC converter 18, which provides output voltage $V_{out}$. For example, power converters using this type of SMPS architecture may be used for low power USB PD adapters providing less than 75 W, such as 30 W USB chargers for small electronic devices such as smartphones and other small electronic device, and for 65 W USB chargers for laptops.

Using GaN transistors, instead of silicon power transistors provides several advantages. Compared to silicon MOSFETs, GaN transistors have lower on-resistance, higher breakdown voltage, no reverse-recovery characteristics. GaN devices have much lower switching losses, so they can operate at higher switching frequencies. For example, in a low power Universal AC/DC adapter for consumer electronics, which use GaN devices, higher switching frequencies allow for the use of smaller capacitors and inductors, which can significantly reduce the power converter size, weight and cost.

Figure 2:
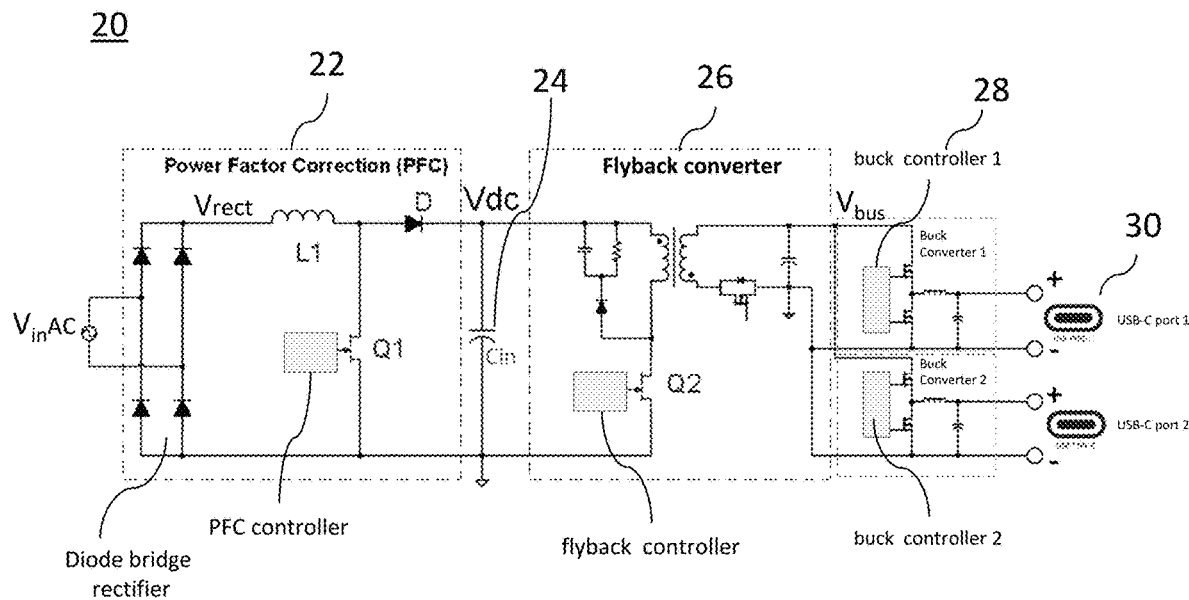
FIG. 2 (Prior Art) shows a circuit schematic for a conventional multi-port AC/DC Switching Mode Power Supply, with PFC.

A typical architecture for an example conventional SMPS comprising a AC/DC power converter 20 for a multi-port AC/DC power delivery adapter comprising two USB-C ports, with power factor correction, is shown in FIG. 2. The first stage 22 is a power factor correction (PFC) circuit comprising a diode bridge rectifier with active power factor correction comprising a boost inductor L1, a diode D and a transistor switch Q1. The power factor correction circuit has inputs for receiving an AC input voltage $V_{inAC}$, and outputs a dc voltage Vdc which is above the peak line input voltage, for charging bulk capacitance $C_{in}$ 24. For example, for a universal AC/DC power delivery adapter, where $V_{inAC}$ may be in a range from $90V_{AC}$ to 260 $V_{AC}$, $V_{dc}$ may typically be set at −390V. This topology may be referred to as a boost (step-up) converter because the $V_{dc}$ (or $V_{boost}$) is higher than the peak line input voltage. The second stage 26 is a single ended Flyback converter, e.g. Quasi Resonant (QR) Flyback converter, controlled by transistor switch Q2, which converts $V_{dc}$ to a bus voltage $V_{bus}$, for example 22V. The bus voltage Vbus is supplied to two USB-C output ports 30, through respective first and second buck converters 28, e.g. to provide each port with an output voltage Vout, e.g. 20V. In this power converter architecture, because Vdc is fixed at 390V, the losses of the PFC inductor and Q1 are larger, resulting in lower efficiency, particularly at low AC input voltage. The PFC operates (is on) under all loading conditions, and the efficiency at light load is lower due to additional losses on the PFC stage for L1 and Q1 and D. The maximum output power for each USB-C port is fixed and cannot be distributed according to requirements of each user device being powered.

To overcome these limitations, and improve efficiency, the following solution is disclosed, comprising power management control (PMC) for PFC On/Off Control (PFCC) and Smart Power Distribution (SPD), which optionally comprises a boost follower circuit (BFC).

Figure 3:
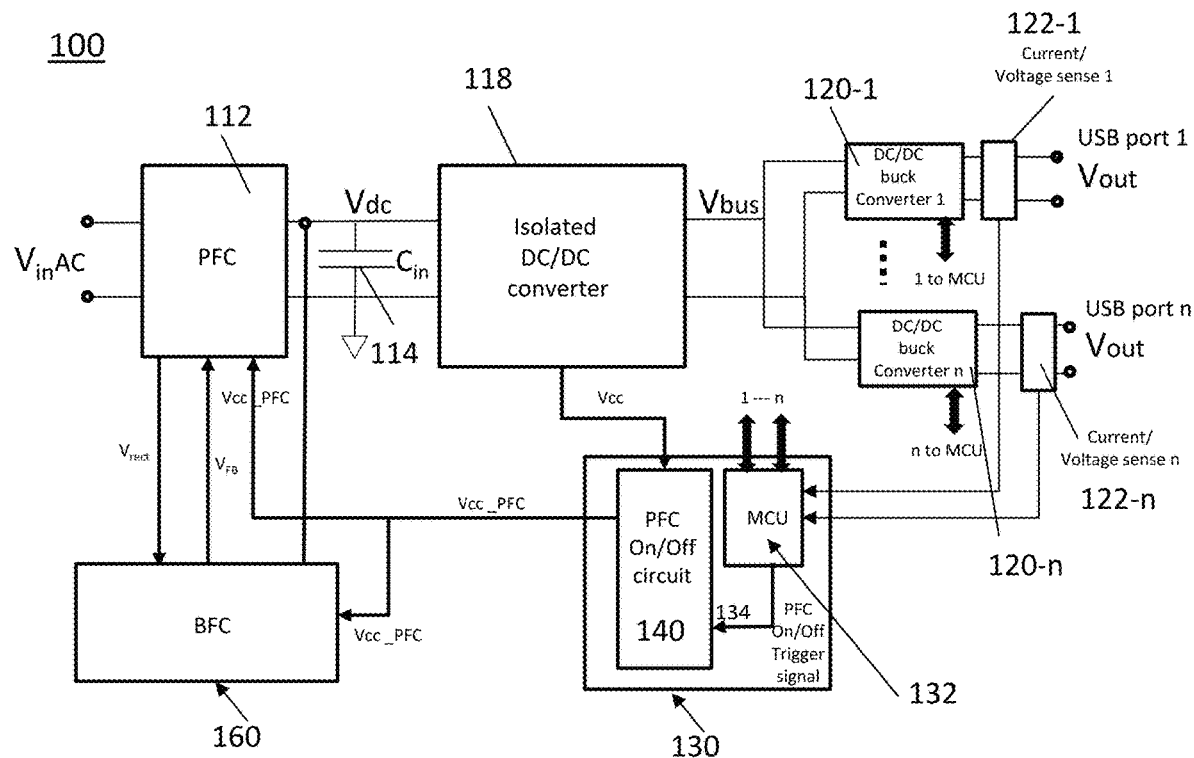
FIG. 3 shows a simplified functional block diagram of a power stage for a multi-port AC/DC SMPS for implementing power management control (PMC) comprising PFC On/Off Control (PFCC) and Smart Power Distribution (SPD) according to embodiments of the present invention.

A simplified functional block diagram to illustrate an architecture of a multi-port USB SMPS 100 for implementing power management control (PMC), comprising PFC On/Off control (PFCC) and Smart Power Distribution (SPD), according to example embodiments is shown in FIG. 3. The SMPS 100 comprises multiple output ports comprising USB ports 1 to n. Input AC voltage $V_{inAC}$ is supplied to PFC circuit 112 to provide $V_{dc}$ to charge input capacitor Ct. 114. The second stage is an isolated DC/DC converter 118, which may have e.g. a QR flyback topology or other flyback topology, to provide bus voltage Vbus, e.g. 22V. Vbus is provided to each of the USB ports 1 to n through DC/DC buck converters 120-1 to 120-n. Each of the USB ports comprise current sense and voltage sense circuits 122-1 to 122-n. The multi-port USB SMPS 100 also comprises a power management control (PMC) circuit 130 for PFC On/Off control (PFCC) and smart power distribution (SPD), and a boost follower circuit (BFC) 160. In some embodiments, the BFC may be omitted.

The power management control (PMC) 130 comprises a microprocessor control unit (MCU) 132 which has inputs to receive current sense and voltage sense signals from current and voltage sense circuits 122-1 to 122-n of each USB port 1 to n. The MCU 132 communicates with the controllers of the DC/DC buck converters 120-1 to 120-n through respective communication links comprising inter-integrated circuit interfaces 1 to n, e.g. using I2C protocol. The MCU is configured to monitor the operational status of each output, i.e. to determine from the DC/DC buck controllers whether or not each of USB port 1 to USB port n is in use, and if so, based on the current and voltage sense signals, what is the output voltage and current of each active port. The MCU computes the output power of each port based on the current and voltage sense signals received from each port, and computes the combined power output of all ports. The MCU is configured to execute power monitoring and control protocols which enable smart power distribution to each of the USB ports, dependent on which ports are in operation, and based on the power being supplied to each port. The MCU also generates a PFC On/Off signal dependent on the combined output power to each of the USB ports to control operation of the PFC. For example, if only one port is in use, and the output power to that port is above a threshold power, e.g. close to a maximum power output, such as 100 W, for charging a laptop, PFC is on. When multiple USB ports are in use, and the combined output power is greater than a specified first threshold value, e.g. >50 W, PFC is on. On the other hand, if one or more USB ports are in use, and their combined output power is less than a specified second threshold value, e.g. <30 W, the MCU operates to turn off the PFC. As illustrated schematically in FIG. 3, the MCU 132 of the power management circuit 130 outputs a PFC On/Off trigger signal 134 dependent on the operational status of each USB port to control a PFC On/Off circuit 140. The PFC On/Off circuit 140 controls a supply voltage Vcc_PFC to the PFC controller of the PFC 112. For example, the; PFC On/Off circuit receives a supply voltage Vcc, e.g. from the isolated DC/DC converter 118. By sensing the operational status and power output of each port, i.e. whether or not an end user device is connected at each port, and how much power is being output, the PMC 130 can manage power-up and power-down sequencing and smartly distribute available power to each USB output port, according to requirements of each device being powered. The PFC On/Off circuit 140 is used for PFC control by providing Vcc_PFC to the PFC to start-up the PFC (e.g. Vcc_PFC=12V) or shut-down the PFC (Vcc_PFC=0V), based on the combined output power of the multiple USB ports.

The BFC 160 operates so that the PFC output voltage $V_{dc}$ continuously follows the input AC voltage $V_{inAC}$. The BFC 160 also receives the supply voltage Vcc_PFC, so that the BFC is turned-on and operating when the PFC is operating. Operation with the BFC improves efficiency, particularly at low line AC input, e.g. in the 90 Vac to 115 Vac range. The operation of the BFC 160 will be described in more detail below, with reference to a BFC of an example embodiment shown in FIG. 6.

Figure 4:
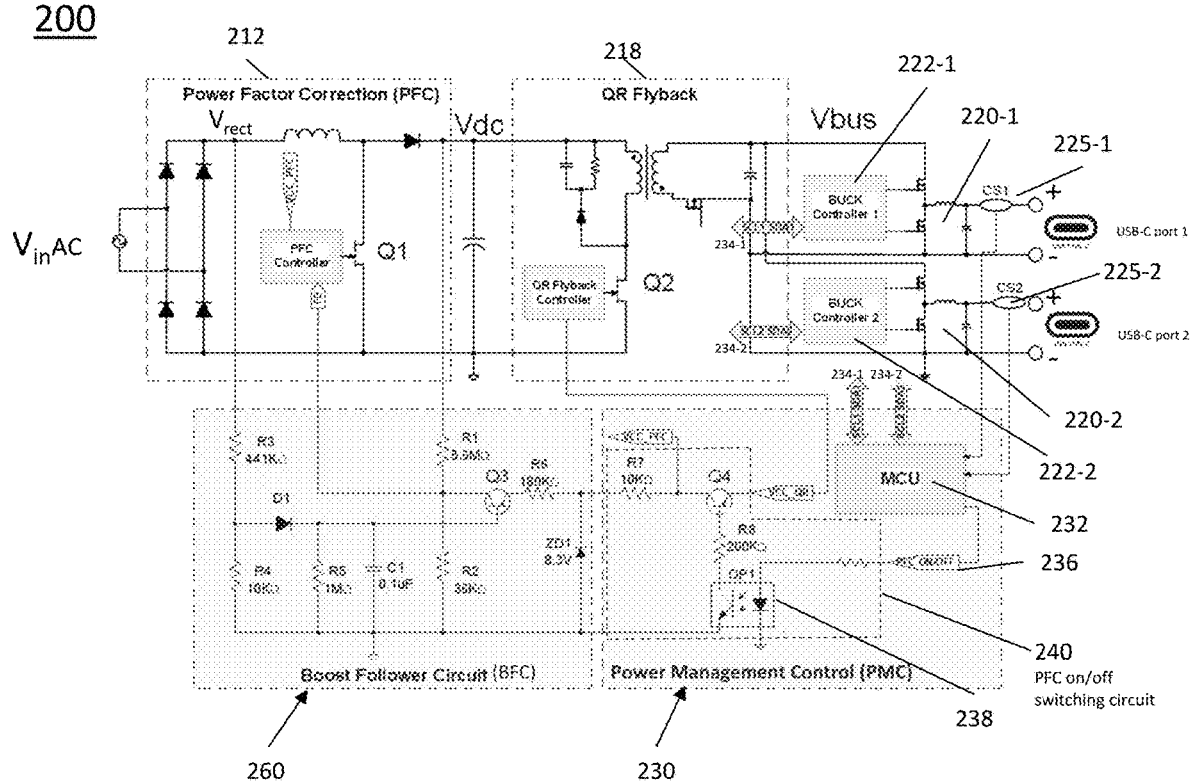
FIG. 4 shows a circuit schematic for a power stage for a multi-port AC/DC PD adapter comprising power management control (PMC) according to a first example embodiment.

A circuit schematic of an architecture for a power stage 200 for a multi-port AC/DC PD adapter of a first example embodiment is shown in FIG. 4. The power stage 200 comprises a power factor correction circuit 212, and an isolated DC/DC converter comprising a QR Flyback converter 218. By way of example only, this embodiment comprises dual USB-C type output ports 1 and 2. The bus voltage $V_{bus}$ is supplied to the first and second USB-C output ports 1 and 2, through respective first and second buck converters 220-1 and 220-2, to provide each port with an output voltage $V_{out}$.

The power stage 200 also comprises power management control (PMC) 230 and a boost follower circuit (BFC) 260. The PMC 230 comprises a microcontroller unit (MCU) 232 and a PFC On/Off switching circuit 240. Each USB-C output port 1 and 2 comprises a current sense circuit and a voltage sense circuit, 225-1 and 225-2, which are interfaced to the MCU to provide current sense signals and voltage sense signals to the microcontroller 232 for each port. The microcontroller 232 also has inter-integrated-circuit interfaces, 234-1 and 234-2 respectively, with the first and second buck controllers 222-1 and 222-2, e.g. using I2C ($I^2C$) protocol. These interfaces allow the microcontroller to sense the output status of each USB-C output port, including whether one or both output ports are active, and the current and voltage sense inputs are used to determine the output power of each output port. Based on the sensed output status (operational status being active or inactive, and corresponding power output) of each port, the microcontroller executes a power delivery protocol which provides a PFC On/Off trigger signal 236, e.g. 5V for PFC turn-on and 0V for PFC turn-off. The PFC On/Off trigger signal 236 is provided to the opto-isolator 238 of the PFC On/Off switching circuit. The PFC On/Off circuit comprises a transistor switch Q4. The gate of Q4 receives the PFC On/Off signal 236 to turn-on or turn-off Q4. The drain of Q4 is connected to a supply voltage input Vcc_QR received from the QR flyback converter, and the source of Q4 is connected to a supply voltage output to provide Vcc_PFC to the PFC controller. Thus the supply voltage for the PFC, Vcc_PFC, is switched-on and switched-off by the PFC On/Off trigger signal provided to the gate of Q4. The PMC 230 enables the PFC to be turned-on and turned-off in response to the real-time sensed output status of each of the USB-C ports 1 and 2.

For example, the MCU computes the total power on the USB-C outputs and generate PFC On/Off signal. The power distribution is controlled only by MCU based on output power, then the hardware circuit controls the VCC_PFC for the PFC ON/OFF as follows:

If PFC On/Off=5V, OP1 and Q4 are conducting and VCC_QR will supply voltage to VCC_PFC, and the PFC operates with the BFC.

If PFC On/Off=0V, OP1 is open and the transistor Q4 disconnects VCC_PFC from VCC_QR, and PFC does not operate; the BFC is also off when the PFC is off.

The PMC provides for smart power distribution of the available power to one or both of the USB-C ports 1 and 2. The power management protocol executed by the MCU may include 1. a start-up mode, 2. a normal operational mode, and a 3. standby mode, depending on the sensed operational status and output power of each USB-C port.

Figure 5:
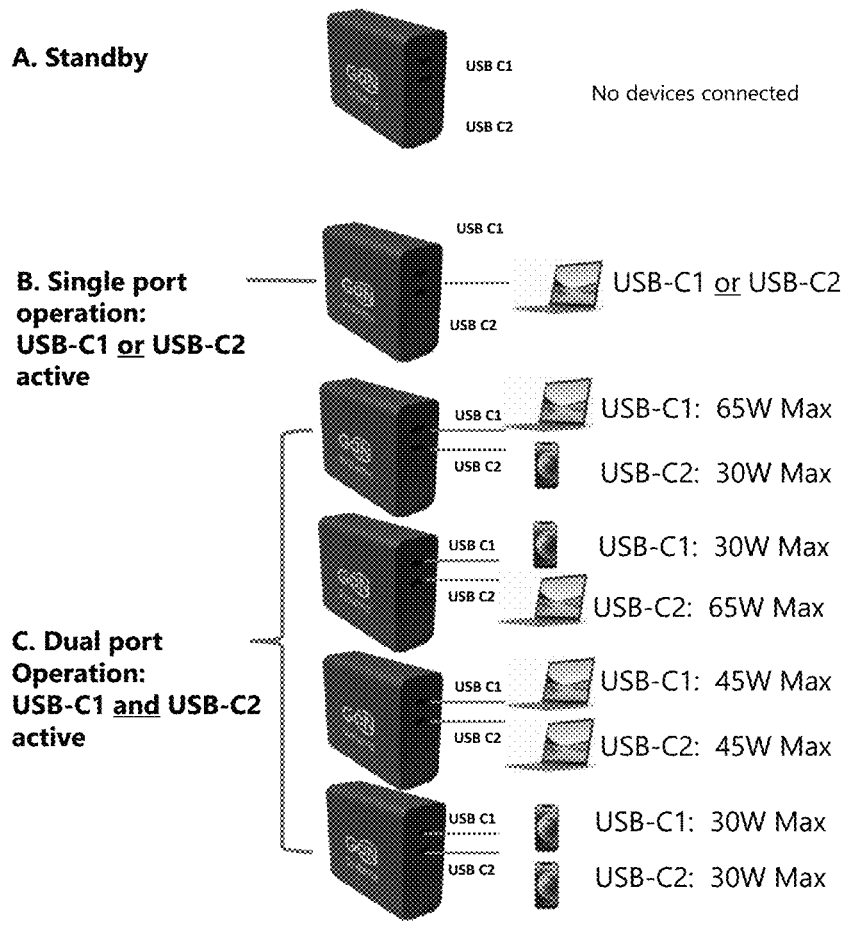
FIG. 5 shows schematically some examples comprising implementation of Smart Power Distribution in a dual port 100 W AC/DC PD adapter.

For an example two port 100 W AC/DC PD adapter, some example output status scenarios are shown in FIG. 5. In example A. standby mode, no devices are connected and both USB C1 and USB C2 ports are idle. In example B. a single USB port is in use, e.g. USB C1 or USB C2 may be selected for powering of one user device, which may be any type of device, up to a maximum output power of 100 W. If only one port is in use, the PMC can direct the maximum available power of 100 W to the port in operation, e.g. to enable fast charging of a laptop. The PFC is switched on or off dependent on whether the load is above or below a specified first threshold value, e.g. 50 W. In example C. both USB ports are in use, to power different combinations of user devices, e.g.: one laptop (65 W max) and one smartphone (30 W max), or two laptops (45 W each), or two smartphones or tablets (30 W each). The power management protocol executed by the MCU enables power to be distributed equally or unequally to the two USB ports. PFC is on when the combined loads of both ports is greater than the first threshold value, e.g. 50 W. PFC is turned off if the combined load falls below a specified second threshold value, e.g. 30 W.

Referring to FIG. 4, the MCU 232 communicates with the buck DC/DC controllers 222-1 and 222-2 using I2C (SCLx, SDAx). When one or two devices are plugged in (as illustrated schematically in FIG. 5) the MCU will detect devices that are connected and the power (voltage, current) of each output port, determine and negotiate the required power management protocols, and send commands to each buck DC/DC controller 222-1 and 222-2 through I2C. The buck DC/DC converters 220-1 and 220-2 will then operate according to the commands from the MCU.

The power stage of the embodiment illustrated in FIG. 4 also comprises a boost follower circuit. For a universal AC/DC PD adapter, without a boost follower circuit, $V_{dc}$ is usually set at 390V. The boost follower circuit provides for the output DC voltage $V_{dc}$ to continuously follow the input AC voltage, e.g. based on sensing $V_{rect}$. A boost follower circuit improves efficiency, especially at low line AC input, e.g. in the 90 Vac to 115 Vac range, because when Vdc follows the Vac, there is a smaller difference between Vac and Vdc. In variants of the power stage of the embodiment shown in FIG. 4, the boost follower circuit may be omitted.

The operation of the BFC is described with reference to FIG. 6. Resistors R1 and R2 form a resistive divider to sense the PFC output voltage of PFC, Vdc. Resistors R3 and R4, capacitor Cs1 and diode D1 are used to sense the AC input peak voltage, i.e. from $V_{rect}$. The bias current $i_{bias}$ is inversely proportional to the AC peak voltage through the transistor Q3, resistor R6, and Zener diode ZD1, which provides a bias voltage. The feedback signal FB is formulated together with $V_{dc}$ and the AC input voltage. The PFC output voltage $V_{dc}$ is equal to:

$$Vdc = \left(\frac{Vref}{R2} - i_{bias}\right) \times R1 + Vref$$

In this example embodiment, $\backslash T_{ref}$ is 2.5V, R2=36Ω, and R1=56 M Ω.

The BFC of the embodiment illustrated in FIG. 4 and FIG. 6 is designed to provide fast sensing of the AC input voltage, using the voltage divider R3 and R4, and the diode D1 and a very small capacitor C1, e.g. 0.1 μF, for fast sensing the peak voltage of $V_{rect}$. The BFC also receives the supply voltage Vcc_PFC, so that the BFC will turn on and off in response to supply voltage Vcc_PFC to the PFC. Since the PFC and the BFC are controlled by the same supply voltage Vcc_PFC, that means that, if the PFC is on, the BFC is on, and when PFC is off, the BFC is off. Also, in this embodiment, a Zener diode is used to regulate VCC_PFC to a bias voltage of BFC e.g. 8.3V, so that the BFC can be used to provide an appropriate feedback voltage, FB to the PFC controller. This means that the BFC circuit of this embodiment is designed to provide a feedback voltage FB in a range that is applicable for control of a range of different PFC controllers, without using an internal reference voltage of the PFC controller for the bias voltage. So, the values of R3, R4, C1 and R6 of the BFC of the example embodiment are selected so that the BFC can be applicable to different PFC controllers, if AC input voltage $V_{inAC}$ is a universal input in the range from 90V to 264V. The BFC of the example embodiment shown in FIGS. 4 and 6 therefore provides more flexibility to be generic to interface to any suitable PFC controller, by using an external bias voltage Vbias (e.g. 8.3V from the Zener diode), and provides fast, instantaneous, sensing of the AC voltage input for real-time control.

In contrast, a conventional BFC (ref. M. O'Loughlin, "Simple circuitry Gets that Old PFC Controller Working in a Boost-Follower PFC Application") uses an RC filter for sensing the AC input voltage, which provides a slow response and obtains an average $V_{inAC}$. Also this BFC circuit uses an internal reference voltage from the PFC controller, specific to a particular PFC controller, which means that other parameters of the circuit must be adjusted to match requirements of a particular PFC controller.

Figure 7:
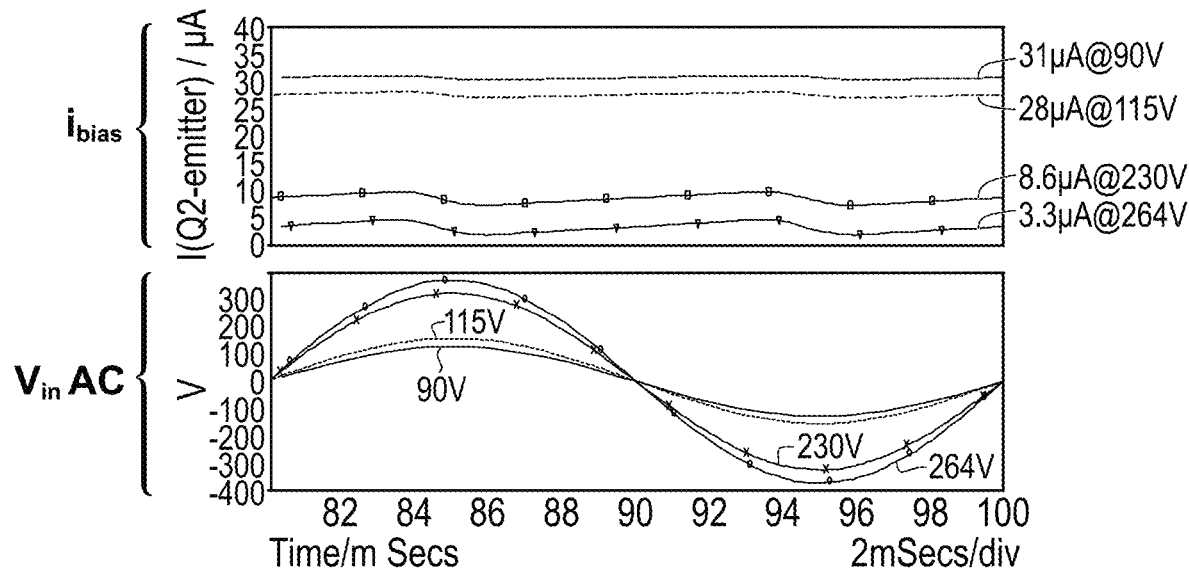
FIG. 7 shows plots of $i_{bias}$ waveforms and $V_{inAC}$ waveforms for AC input voltages $V_{AC}$ of 90V, 115V, 230V and 264V.
Figure 8:
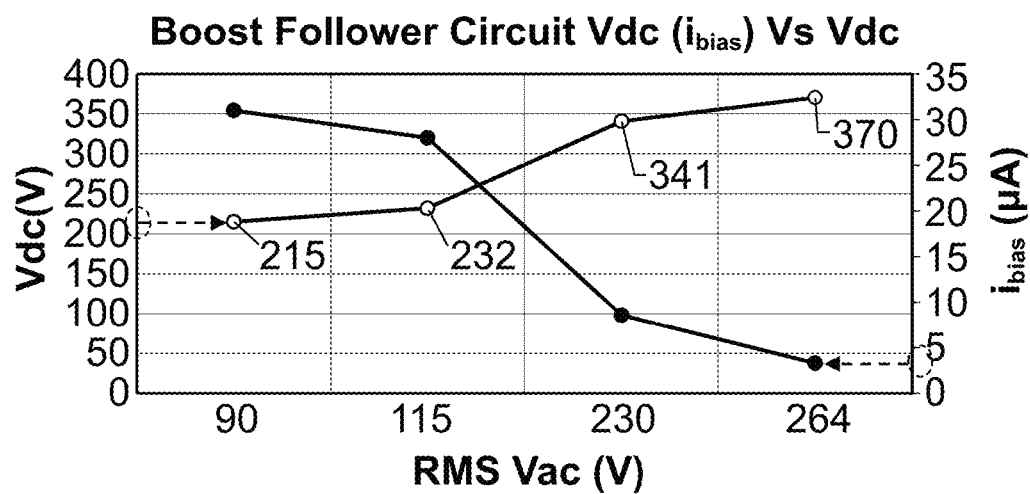
FIG. 8 shows plots of $V_{dc}$ and $i_{bias}$ vs. RMS $V_{in}AC$.

FIGS. 7 and 8 shows some example data for the AC/DC PC adapter of the example embodiment shown in FIG. 4, to illustrate operation of the BFC 160. FIG. 7 shows plots of $i_{bias}$ waveform and $V_{inAC}$ waveforms for AC input voltages of 90V, 115V, 230V and 264V. 110 Vac, relative to high line input at 230 Vac and 264 Vac. FIG. 8 shows corresponding plots of $V_{dc}$ and $i_{bias}$ vs. rms $V_{inAC}$.

The utility of the PMC for PFC On/Off control and Smart Power Distribution will be described with reference to an example 100 W PD adapter, with dual USB-C ports, e.g. as shown schematically in FIG. 5 and comprising the power stage illustrated in FIG. 4. Protocols for PMC operation will be described with reference to the flowcharts shown FIGS. 9, 10 and 11. In this embodiment there are three operational modes: 1. Start-up mode (FIG. 9); 2. Normal operational mode (FIG. 10); and 3. Standby mode (FIG. 11). The MCU is configured to execute control protocols for each mode, dependent on inputs received, including the current sense signals and voltage sense signals from each USB port, and information on operational state received via the I2C interfaces between the MCU and the controllers for each buck converter.

Figure 9:
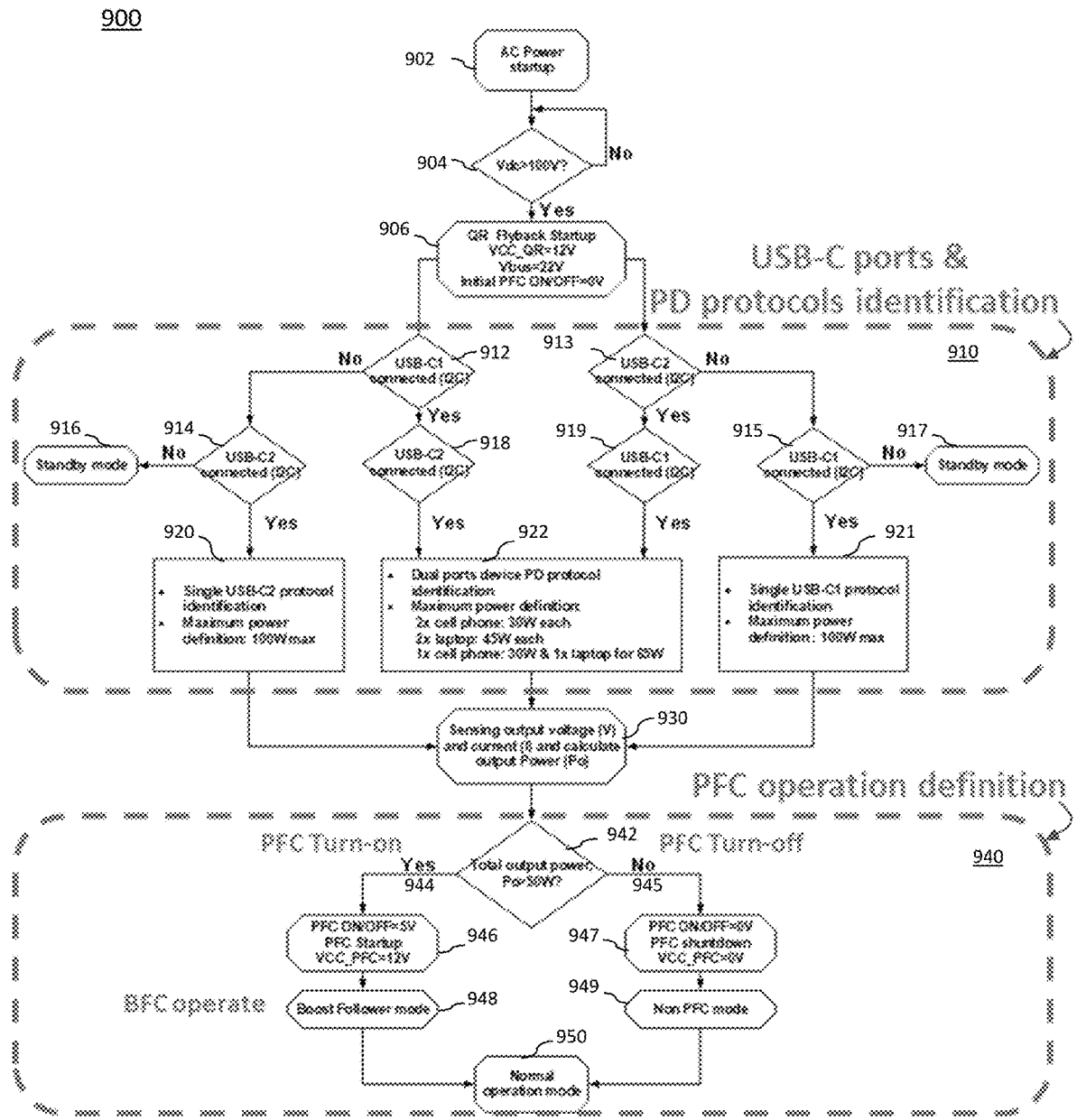
FIG. 9 shows a flow chart for power management control of an embodiment comprising PFC On/Off control and smart power distribution for start-up mode.

Referring to the flowchart 900 illustrated in FIG. 9, in Start-up mode, on AC power startup 902, the QR Flyback converter is initially off (Vcc_QR=0) and when Vdc exceeds 100V, at 904, the QR Flyback converter is started up by turning on its power supply, e.g. Vcc_QR=12V. When the QR Flyback completes the start-up and is operating as normal, the bus voltage Vbus is 22V. Initially PFC_On/Off is set at 0V, so that the PFC is off at step 906. The start-up mode then proceeds to step 910, USB-C ports and power distribution (PD) protocols identification. This protocol identification includes identification of active USB-C ports, and depending on whether one or more ports are active, negotiating what is the maximum available power for each port.

At step 912 it is determined if USB-C1 is active or not, then at step 914 it is determined if USB-C2 is active or not. If neither port is active, at step 917, the protocol reverts to standby mode. If USB-C1 is active and USB-C2 is not active, at 920 a single port PD protocol for USB-C1 is identified, with a maximum output power definition of 100 W. Correspondingly, at step 913 it is determined if USB-C2 is active or not, then at step 915 it is determined if USB-C2 is active or not. If USB-C2 is active and USB-C1 is not active, at 921, a single port PD protocol is identified for USB-C2, with a maximum output power definition of 100 W.

If at steps 918 and 919 it is determined that both USB-C1 and USB-C2 are active, at 922 a dual port device PD protocol is identified and a maximum power definition is defined for each port.

Standby mode is illustrated in the flowchart 1100 in FIG. 11. Standby mode comprises periodically monitoring the operational status of each port, e.g. using a monitoring cycle time/period, e.g. 40 ms, to update the normal operational status in real-time or continue in standby mode.

As shown in FIG. 9, at step 920 or 921, if only one port is active, the protocol proceeds to specify a maximum available power for the one active port, e.g. 100 W. In the queries at steps 918 or 919, if two ports are active, then at step 922 a power distribution protocol is identified to distribute power to each port dependent on load at each port. Based on inputs from the current sense and voltage sense for each USB-C port, at step 930, the output power for each port is calculated $P_{o1}$ and $P_{o2}$, and the total output power $P_o$ is computed. Although the power management protocol for the PD adapter of this example embodiment is explained for a dual port PD adapter, the protocol may be extended to a multi-port PD adapter with n ports, to determine the operational state of each of the n ports, and to compute the output power for each port, e.g. $P_{o1}, P_{o2} \ldots P_{on}$. In step 930, if there are two or more active ports, the combined output power of all operational ports is computed.

The protocol then proceeds to PFC operation definition 940, which determines if the PFC is to be on or off. At step 942 there is a query to determine if the combined output power Po is greater than a first threshold value, e.g. >50 W. If $P_o$ is greater than the first threshold value, at 944 the PFC Turn-on protocol is initiated, by setting PFC_On/Off trigger signal to e.g. 5V, so that the PFC_On/Off circuit operates to provide supply voltage Vcc_PFC, e.g. 12V to the PFC to start up the PFC at step 946. At step 948, the BFC also receives supply voltage Vcc_PFC, so that when the PFC is turned on, the BFC is also turned on to implement boost follower mode 948. The protocol then proceeds to normal operational mode 950. At step 942, if the combined output power Po is less than the first threshold value, e.g. ≤50 W, the PFC remains off, or the PFC is shut down, e.g. by setting the PFC_On/Off trigger signal to 0V, and the PFC_On/Off circuit operates to provide supply voltage Vcc_PFC=0V to the PFC at step 947, so that the PFC and BFC are off, and the PD adapter operates in non-PFC mode 949. The protocol then proceeds to normal operational mode 950.

The flow chart 1000 in FIG. 10 illustrates schematically one cycle (period) in normal operational mode, initiated at step 1002. The MCU monitors the operational status of each USB port on a cyclical basis, so that during each cycle, e.g. each cycle has a period of 40 ms, the real-time operational status of each port is monitored at step 1004. If one or both USB ports are active, the USB-C ports and PD protocols identification step 1008 is implemented, e.g. as illustrated in more detail for step 910 in FIG. 9. If a port is inactive, at step 1006, the protocol reverts to standby mode for that port. At step 1010, the sensed input signals for current and voltage for each port are used to compute output power $P_{o1}$ and $P_{o2}$ to determine the combined output power $P_o$. An important next step at 1020 is verification of the PFC On/Off precondition, which determines whether the PFC_On/Off trigger signal is ON (e.g. 5V) or off (0V). After the verification step 1020 the protocol then proceeds to PFC_On/Off mode 1030. For example, if at step 1020 the PFC is off (PFC ON/OFF=0V), and at step 1032 if the total combined output power for both ports is greater than the specified threshold value, e.g. >50 W, PFC is turned-on at 1034, and BFC is also turned on at 1036. The PD adapter operates with PFC and BFC. At step 1032, if the total output power is less than the first threshold value, e.g. <50 W the PFC remains off and the protocol reverts to 1002 for the next cycle of operational mode.

At 1020, if the PFC is on (PFC_ON/OFF=5V), and at step 1033, if the total combined output power for both ports is below the specified second threshold value, e.g. <30 W, PFC is turned-off at 1035, and the PD adapter is operated in non-PFC mode (with the PFC and BFC shut-down 1037). At step 1033, if the total output power is greater than the second threshold value, e.g. ≥30 W the PFC remains on and the protocol reverts to 1002 for the next cycle of operational mode.

The specified first and second threshold values for turning-on and turning-off the PFC differ by a hysteresis value, which may be referred to as switching differential value. That is, the two threshold values differ by a hysteresis value, e.g. 10 W or 20 W, which is sufficient to avoid a situation in which the PFC frequently turns ON and turns OFF unnecessarily, e.g. during small fluctuations in total output power from cycle-to-cycle. This type of situation is managed by the step of verification of the PFC precondition at step 1020 in each cycle, to verify if the PFC is in an on-state or off-state, before operating the PFC On/Off mode 1020. This avoids unnecessary or unwarranted turn-on and turn-off of the PFC, when the current operational status is appropriate to maintain an existing on-state or an off-state. In normal operational mode, e.g. using a 40 ms cycle time, during each cycle, the status of each port USB-Cx is detected (e.g. status of each of ports USB-C1, USB-C2 . . . to USB-Cn if there are n ports), and the PFC On/Off precondition is determined as on or off; the power management protocol steps are then implemented to manage the PFC On/Off mode 1030 accordingly.

Figure 12:
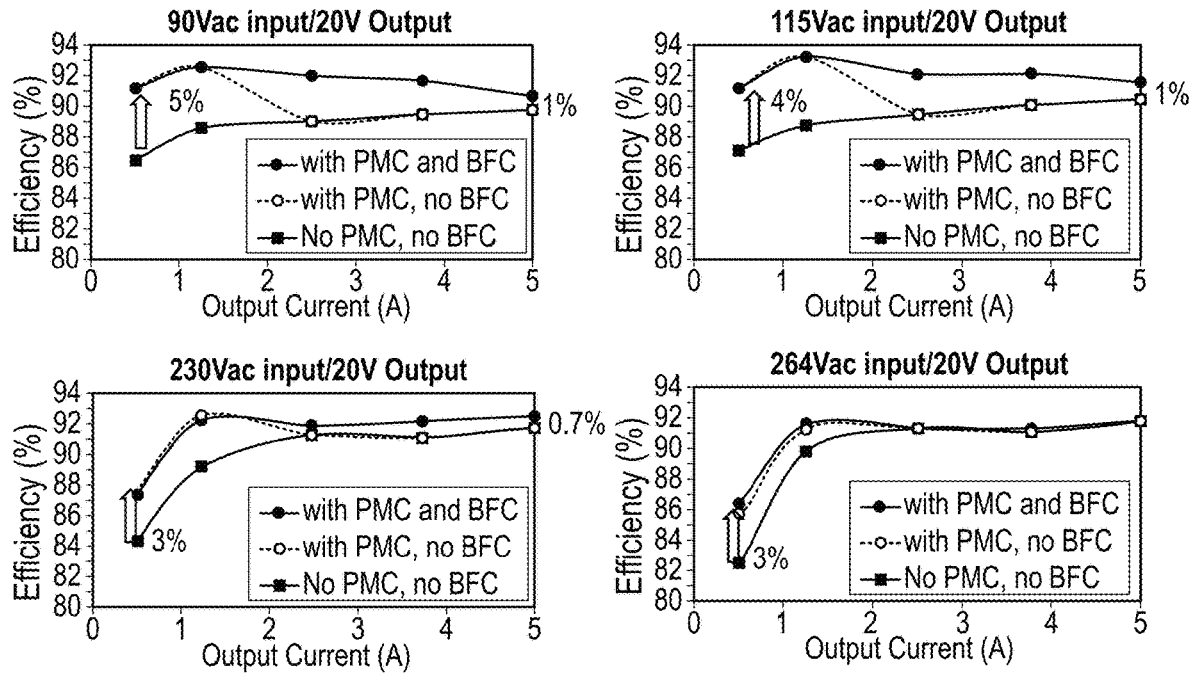
FIG. 12 shows some plots of test measurements for an example 100 W 2x USB-C port PD adapter to compare efficiency for three test cases: 1. With PMC and BFC; 2. with PMC, without BFC, and 3. without PMC and without BFC; and in each test, for operation at different $V_{AC}$ input voltages.
Figure 13:
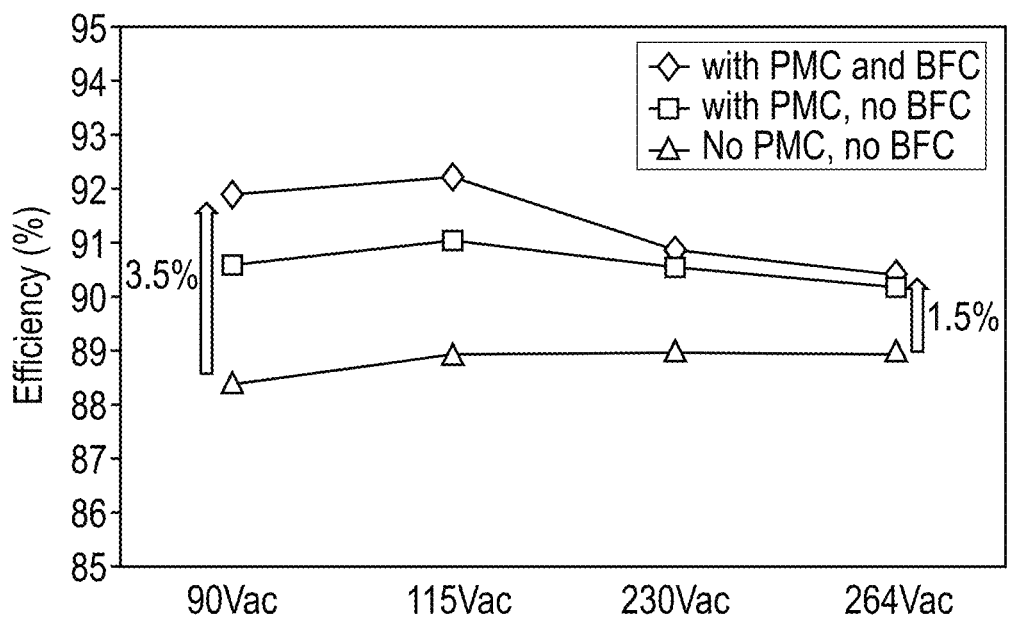
FIG. 13 shows some plots to compare average efficiency of the example 100 W 2x USB-C port PD adapter for different AC input voltages $V_{AC}$.

To illustrate the utility of the power stage 200 comprising the PMC 230, comprising PFC control and smart power distribution, and BFC 260, of the first example embodiment illustrated in FIG. 4, implemented as a dual port USB 100 W PD adapter, FIGS. 12 and 13 provide some results of test measurements for the PD adapter of the example embodiment, to compare operation with and without PMC, comprising PFC On/Off and SPD, and optionally with the BFC.

FIG. 12 shows some plots to compare efficiency for three test cases, with and without SPD and BFC, for operation at different $V_{AC}$ input voltages. FIG. 13 shows some plots to compare average efficiency at different $V_{AC}$ input voltages. As illustrated by the data shown in FIG. 12, for operation at 90 Vac line input or 115 Vac line input, and 20V output, a power stage with PMC comprising PFC On/Off control and SPD provides a significant increase efficiency (4%-5%) over a range of output current between 0.5 A and 2 A (light load, e.g. 10 W to 40 W output power). A power stage with both PMC and BFC provides an increase efficiency over the entire range of output current between 0.5 A and 5 A (10 W to 100 W output power). As illustrated by the data shown in FIG. 12, for operation at 230 Vac line input and 264 Vac line input, the power stage with SPD provides improved efficiency by 3% at lower power, e.g. 0.5 A to 2 A output current, and the BFC contributes less significantly to improving the efficiency. These results are also illustrated in the plots shown in FIG. 13, which show an average efficiency, which is the average efficiency at 10%, 25%, 50%, and 75% load, for different VAC line inputs, with PMC and BFC, with PMC and no BFC, and without PMC and BFC. Average efficiency is increased by up to 1.5% at higher AC line input voltages, and by up to 3.5% at low AC line input voltages. Thus, the power stage of the example embodiment comprising both PMC, comprising PFC On/Off control and SPD, and BFC provides smart power distribution to adapt to load on one or both ports, to provide higher light load efficiency, e.g. 3% to 5% improvement, and higher full load efficiency, e.g. 0.7% to 1% improvement. Overall, there is improved average efficiency, with 1.5% to 3.5% improvement in efficiency, and therefore corresponding energy savings.

Thus, multi-port SMPS of example embodiments, such as a multi-port USB-C PD adapter, with PMC comprising PFCC and SPD, and optionally BFC, can provide at least one of enhanced performance, improved reliability, and control power distribution amongst multiple ports. Example embodiments are described by way of example with reference to multiport USB-C PD adapters, e.g. 100 W maximum output for charging personal electronic devices. PD adapters of alternative embodiments may comprise other types of standard ports which are commonly used for powering or charging mobile electronic devices such as phones, tablets and laptops. For example, these may be USB-C type ports, other types of USB ports, Lightning® ports, and other types of ports that are compatible with/compliant with current PD standards or other future standards, for low power applications, e.g. in the range of maximum output of 100 W, or 150 W. In some applications the PD adapter may comprise a combination of different types of ports, e.g. one or more USB-C ports to support higher power charging, e.g. up to 100 W, or higher, for fast charging of laptops, and e.g. one or more USB-A ports to support low power charging, e.g. 18 W to 30 W, e.g. for older devices which do not support USB-C and other smartphones and peripherals that work with USB-A and do not require more than 30 W. In PD adapters of embodiments supporting this type of application, the power management protocol executed by the MCU may be implemented to turn-off PFC if only two lower power ports are active, for a maximum power output of 18 W each. If one or more USB-C ports are active for charging one or more devices requiring a total output power of ≥75 W, to comply with applicable PD standards, PFC is turned on. In any applications comprising multiple ports of different types, if only the low power charging ports are active, and the combined power is less than a specified low power (second) threshold value, the PFC and BFC are turned off. If the combined output power of ports of all types exceeds a specified high power (first) threshold value, PFC is turned on, and if included, the BFC is also on.

Since implementation of PD adapters with PMC comprising PFCC and SPC, and optionally BFC, has been demonstrated to provide improved efficiency for low AC line input, and lower loads, this multiport SMPS device architecture offers a cost-effective solution, which may be particularly beneficial to achieve improved efficiency for lower power applications at lower AC line input. For example, for charging of one or several mobile electronic devices, such as phones, tablets, and laptops where a maximum output power may exceed 75 W, e.g. ~100 W peak output power, for which PD standards require PFC, for use in North America and other countries using ~120V AC, turning off PFC at low load offers a significant improvement in efficiency.

Additionally, while external USB PD adapters are described by way of example, it is envisaged that AC/DC SMPS of other example embodiments may be units or modules incorporated into AC wall outlets comprising multiple USB charging ports for wired charging mobile devices and other electronic devices. In other example embodiments, AC/DC SMPS implementing PMC features comprising PFCC and SPC, and optionally BFC, may be implemented as built-in units or modules incorporated into furniture, e.g. into a desk, a nightstand/bedside table, coffee table et al., or incorporated into other types of electrical fixtures, such as a base of a table lamp, e.g. to provide convenient access to multi-port low voltage charging outlets, such as USB-C ports, distributed throughout a home or office environment.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A multi-port AC/DC Switching Mode Power Supply (SMPS) comprising a power factor correction circuit (PFC) for converting an AC input voltage to a DC voltage Vdc, and a DC/DC converter which receives Vdc and supplies a bus voltage Vbus to a plurality of output ports, each output port comprising a DC/DC buck converter providing an output voltage Vout, comprising:
power control comprising a microcontroller unit (MCU) and a PFC On/Off control circuit for providing a supply voltage Vcc_PFC to a controller of the PFC (PFC controller) to turn the PFC on and off;
each of the output ports comprising a current sense circuit and a voltage sense circuit which output current sense and voltage sense signals;
the MCU having inputs for receiving said current sense and voltage sense signals from the current sense circuit and voltage sense circuit of each output port, and having an interface to controllers of the DC/DC buck converters of each of the output ports;
the MCU being configured to execute a power management protocol comprising:
obtaining an output status comprising an operational status of each output port, and an output power of each output port, computed from the current and voltage sense signals from each output port, and
based on the output status, outputting a PFC On/Off trigger signal to the PFC on/off control circuit to control the supply voltage VccPFC to the PFC controller to turn the PFC on or off.

2. The multi-port AC/DC SMPS of claim 1, wherein outputting the PFC On/Off trigger signal to the PFC on/off control circuit comprises:
when the combined output power is greater than a first threshold value, outputting a PFC On/Off signal which turns on the PFC or maintains the PFC in an on-state; and
when the combined output power is less than a second threshold value, outputting a PFC On/Off signal which turns off the PFC or maintains the PFC in an off-state.

3. The multi-port AC/DC SMPS of claim 1, wherein the power management protocol comprises:
when only one output port is operational, enabling a maximum output power to be supplied to said one output port; and
when two or more output ports are operational, enabling power distribution of the maximum output power amongst the two or more output ports that are operational.

4. The multi-port AC/DC SMPS of claim 3, wherein power distribution amongst two or more output ports is unequal.

5. The multi-port AC/DC SMPS of claim 1, wherein the DC/DC converter has a single end Flyback topology comprising a Quasi-Resonant Flyback topology, an Active Clamp Flyback Topology or another type of single end Flyback topology.

6. The multi-port AC/DC SMPS of claim 1, comprising a Boost Follower Circuit (BFC).

7. The multi-port SMPS of claim 6, wherein the BFC is controlled by the supply voltage Vcc_PFC so that the BFC is turned on when the PFC is turned on and the BFC is turned off when the PFC is turned off.

8. The multi-port AC/DC SMPS of claim 6, wherein the BFC comprises:
a first voltage divider comprising resistors R1 and R2 to sense the PFC output voltage Vdc;
a second voltage divider comprising resistors R3 and R4, a diode D1 and a capacitor C1 to sense the AC input peak voltage from Vrect;
a transistor Q3, resistor R6, and Zener diode ZD1 configured to provide a bias current $i_{bias}$, wherein bias current $i_{bias}$ is inversely proportional to the AC peak voltage through the transistor Q3, resistor R6, and Zener diode ZD1, which provides a bias voltage; and
wherein a feedback signal FB is provided to the PFC controller and the PFC output voltage $V_{dc}$ follows with input AC voltage and is equal to:

$$Vdc = \left(\frac{Vref}{R2} - i_{bias}\right) \times R1 + Vref.$$

9. The multi-port AC/DC SMPS of claim 8, wherein the BFC is controlled by the same supply voltage Vcc_PFC, as for the PFC, so that when the PFC is on, the BFC is on, and when the PFC is off, the BFC is off.

10. The multi-port AC/DC SMPS of claim 1, wherein the power management protocol comprises:
- a start-up mode;
- a normal operational mode; and
- a standby mode.

11. The multi-port AC/DC SMPS of claim 10, wherein the normal operational mode comprises, in each operational cycle,
- identifying which of the plurality of output ports are operational;
- when none of the output ports are operational reverting to standby mode;
- when only one of the output ports is operational defining single port power distribution of maximum available power to said one port;
- when two or more output ports are operational defining multi-port power distribution amongst the two or more output ports;
- verifying a precondition of the PFC to determine if the PFC is on or off computing the total output power from the sensed output voltage and current of each port;
- determining if the total output power is above or below a first threshold value; and
  - when the PFC is off and total output power is above the first threshold value, turning on the PFC to operate in PFC mode; or
  - when the PFC is on and the total output power is below the first threshold value, maintaining the PFC in an off-state to operate in non PFC mode; or
  - when the PFC is on and total output power is above the first threshold value, maintaining the PFC in an on-state to operate in PFC mode; or
  - when the PFC is on and the total output power is below a second threshold value, turning off the PFC to in non PFC mode.

12. The multi-port AC/DC SMPS of claim 10, wherein the start-up mode comprises:
- at turn-on of the DC/DC converter identifying which of the plurality of output ports are operational;
- when none of the output ports are operational reverting to standby mode;
- when only one of the output ports is operational defining single port power distribution of maximum available power to said one port;
- when two or more output ports are operational defining multi-port power distribution amongst the two or more output ports;
- computing the total output power from the sensed output voltage and current of each port;
- determining if the total output power is above or below a first threshold value;
- when the total output power is above the first threshold value, turning on PFC;
- when the total output power is below the first threshold value, turning off PFC; and
- proceeding to normal operational mode.

13. The multi-port AC/DC SMPS of claim 10, wherein standby mode comprises periodically monitoring the output status to determine if one or more output ports are operational and if one or more ports are operational, proceeding to start-up mode or normal operational mode.

14. The multi-port AC/DC SMPS of claim 1, wherein the output ports comprise USB-C output ports.

15. The multi-port AC/DC SMPS of claim 1, wherein the output ports comprise any one of USB ports, Lightning® ports, other ports compatible with Power Delivery standards, and a combination thereof.

16. The multi-port AC/DC SMPS of claim 1, being a Power Delivery (PD) adapter.

17. A power management circuit for a multi-port AC/DC Switching Mode Power Supply (SMPS), wherein the SMPS comprises a power factor correction circuit (PFC) for converting an AC input voltage to a DC voltage Vdc and a DC/DC converter which receives Vdc and supplies a bus voltage Vbus to a plurality of output ports, each comprising a DC/DC buck converter providing an output voltage Vout, the power management/distribution circuit comprising:
- a microcontroller unit (MCU) and a PFC On/Off control circuit for providing a supply voltage Vcc_PFC to a controller of the PFC (PFC controller) to turn the PFC on and off;
- each of the output ports comprising a current sense circuit and a voltage sense circuit which output current sense and voltage sense signals;
- the MCU having inputs for receiving said current sense and voltage sense signals from the current sense circuit and voltage sense circuit of each output port, and having an interface to controllers of the DC/DC buck converters of each of the output ports;
- the MCU being configured to execute a power management protocol comprising:
  - obtaining an output status comprising an operational status of each output port, and an output power of each output port, computed from the current and voltage sense signals from each output port, and
  - based on the output status, outputting a PFC On/Off trigger signal to the PFC on/off control circuit to control the supply voltage VccPFC to the PFC controller to turn the PFC on or off.

18. The power management circuit of claim 17, wherein outputting the PFC On/Off trigger signal to the PFC on/off control circuit comprises:
- when the combined output power is greater than a first threshold value, outputting a PFC On/Off signal which turns on the PFC or maintains the PFC in an on-state; and
- when the combined output power is less than a second threshold value, outputting a PFC On/Off signal which turns off the PFC or maintains the PFC in an off-state.

19. The power management circuit of claim 17, wherein the power management protocol comprises:
- when only one output port is operational, enabling a maximum output power to be supplied to said one output port; and
- when two or more output ports are operational, enabling power distribution of the maximum output power amongst the two or more output ports that are operational.

20. The power management circuit of claim 19, wherein power distribution amongst two or more output ports is unequal.

21. The power management circuit of claim 15, wherein the DC/DC converter has a single end Flyback topology comprising a Quasi-Resonant Flyback topology, an Active Clamp Flyback Topology or another type of Flyback topology.

22. The power management circuit of claim 17, comprising a Boost Follower Circuit (BFC).

23. The power management circuit of claim 22 wherein the BFC is controlled by the supply voltage Vcc_PFC so that the BFC is turned on when the PFC is turned on and the BFC is turned off when the PFC is turned off.

24. The power management circuit of claim 15, wherein the power management protocol comprises:
 a start-up mode;
 a normal operational mode; and
 a standby mode.

25. The power management circuit of claim 24, wherein the normal operational mode comprises, in each operational cycle,
 identifying which of the plurality of output ports are operational;
 when none of the output ports are operational reverting to standby mode;
 when only one of the output ports is operational defining single port power distribution of maximum available power to said one port;
 when two or more output ports are operational defining multi-port power distribution amongst the two or more output ports;
 verifying a precondition of the PFC to determine if the PFC is on or off
 computing the total output power from the sensed output voltage and current of each port;
 determining if the total output power is above or below a first threshold value; and
 when the PFC is off and total output power is above the first threshold value, turning on the PFC to operate in PFC mode; or
 when the PFC is on and the total output power is below the first threshold value, maintaining the PFC in an off-state to operate in non PFC mode; or
 when the PFC is on and total output power is above the first threshold value, maintaining the PFC in an on-state to operate in PFC mode; or
 when the PFC is on and the total output power is below a second threshold value, turning off the PFC to in non-PFC mode.

26. The power management circuit of claim 24, wherein the start-up mode comprises:
 at turn-on of the DC/DC converter identifying which of the plurality of output ports are operational;
 when none of the output ports are operational reverting to standby mode;
 when only one of the output ports is operational defining single port power distribution of maximum available power to said one port;
 when two or more output ports are operational defining multi-port power distribution amongst the two or more output ports;
 computing the total output power from the sensed output voltage and current of each port;
 determining if the total output power is above or below a first threshold value;
 when the total output power is above the first threshold value, turning on PFC;
 when the total output power is below the first threshold value, turning off PFC; and
 proceeding to normal operational mode.

27. The power management circuit of claim 24, wherein standby mode comprises periodically monitoring the output status to determine if one or more output ports are operational and if one or more ports are operational, proceeding to start-up mode or normal operational mode.

28. The power management circuit of claim 17, wherein the output ports comprise USB-C output ports.

29. The power management circuit of claim 17, wherein the output ports comprise any one of USB ports, Lightning® ports, other ports compatible with Power Delivery standards, and a combination thereof.

30. The power management circuit of claim 17, integrated as part of a Power Delivery (PD) adapter.

* * * * *